May 19, 1931. A. A. BULL 1,805,903
OIL FILTER
Filed July 23, 1928 2 Sheets-Sheet 1
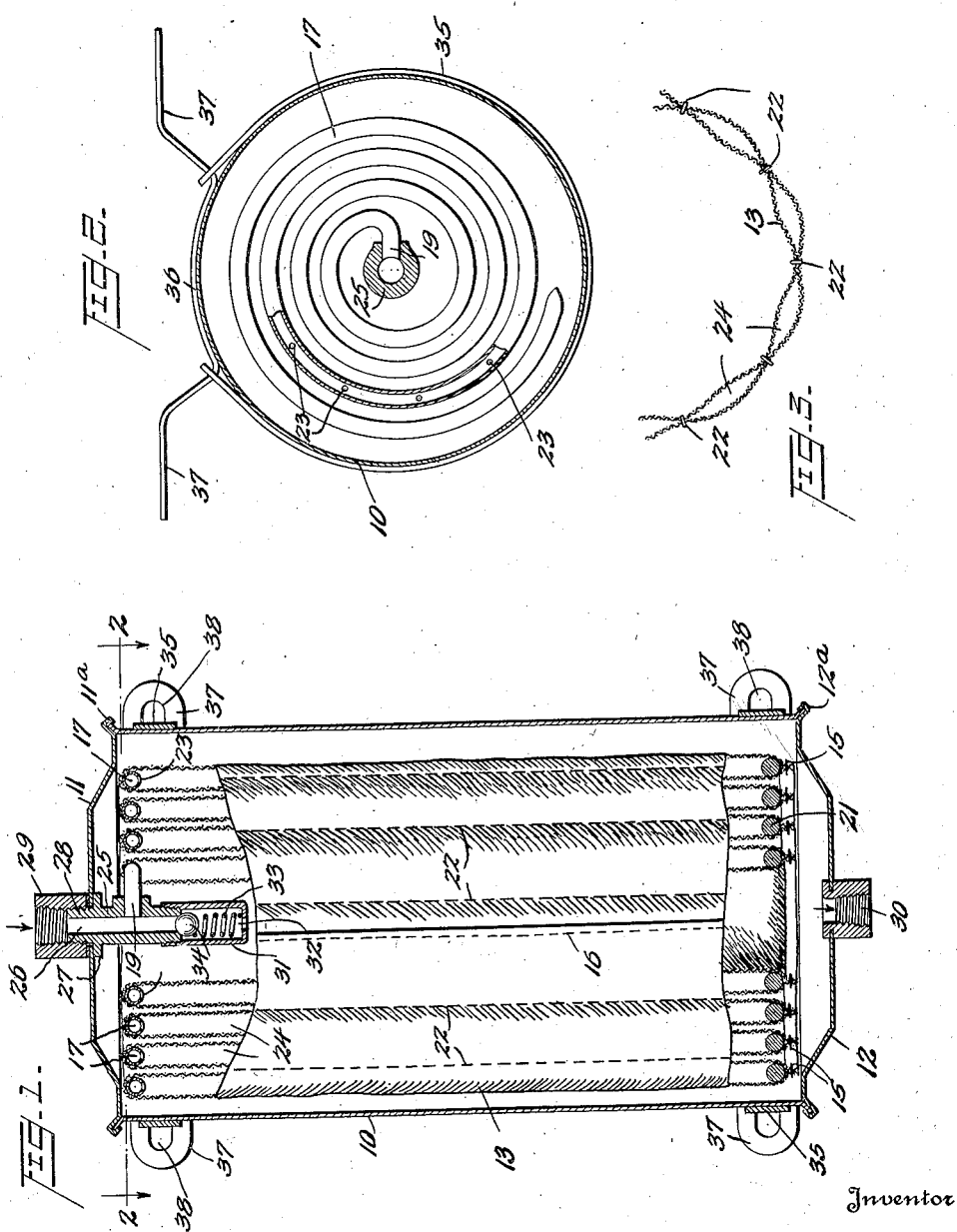
Inventor
Arthur A. Bull,
By Watson, Coit, Morse
& Grindle
Attorney May 19, 1931.  A. A. BULL  1,805,903
OIL FILTER
Filed July 23, 1928   2 Sheets-Sheet 2
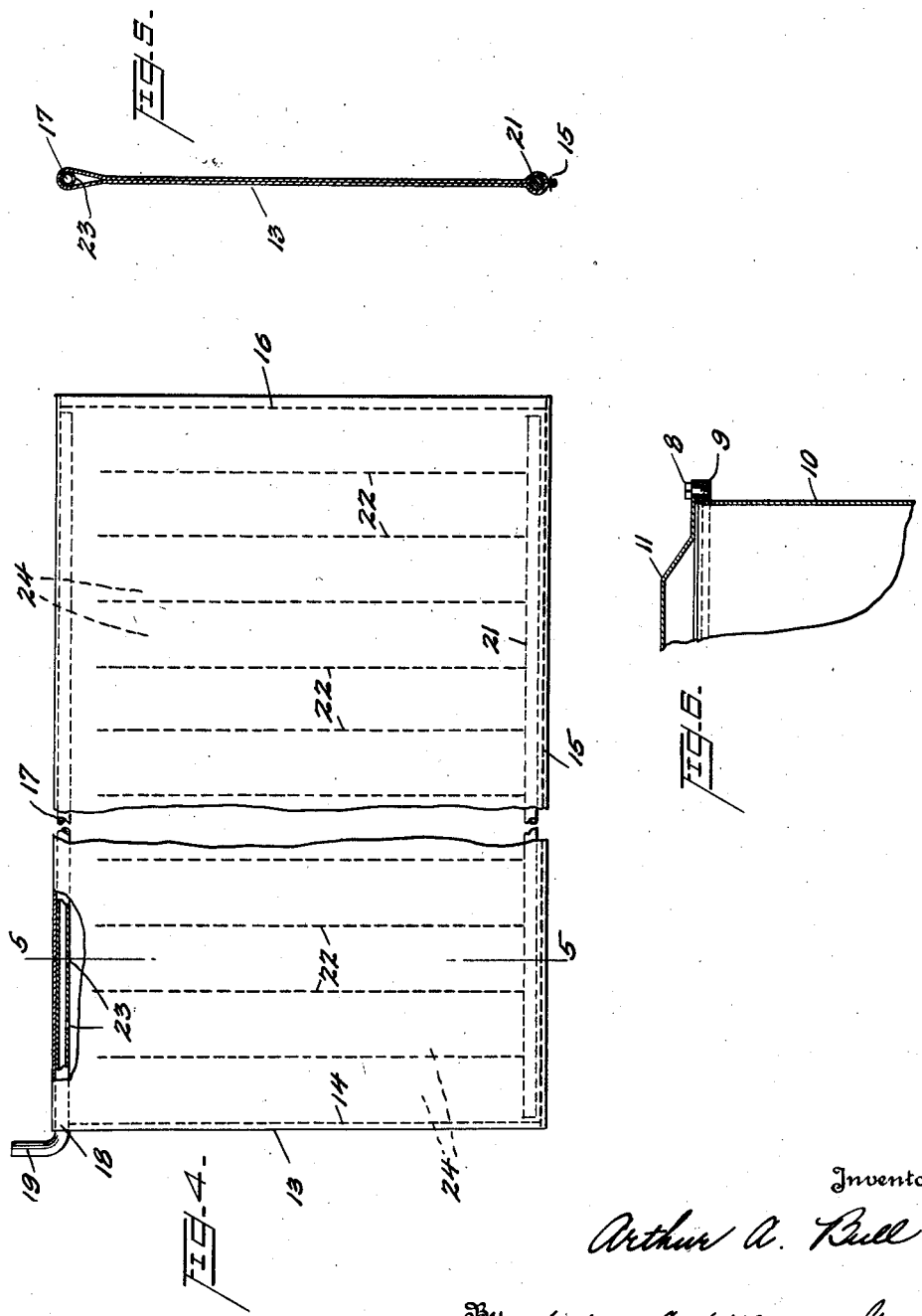
Inventor
Arthur A. Bull
By Watson, Coit, Morse & Grindle
Attorney Patented May 19, 1931

1,805,903

UNITED STATES PATENT OFFICE

ARTHUR A. BULL, OF DETROIT, MICHIGAN, ASSIGNOR, BY MESNE ASSIGNMENTS, TO HANDY CLEANER CORPORATION, OF DETROIT, MICHIGAN, A CORPORATION OF MICHIGAN

OIL FILTER

Application filed July 23, 1928. Serial No. 294,738.

The present invention relates to filters and more particularly to the type of filter adapted for keeping clean the oil employed for lubricating internal combustion motors such as the motors used in motor vehicles.

One of the objects of the present invention is the provision of a filter of this type with an extensive filtering area disposed in a small space.

Another object of the invention is to positively utilize the entire filtering area as distinguished from a filter wherein there is a localized delivery of the oil to a small section of the area, which tends to clog it at that particular point, set up increased resistance, and prevent the efficient use of the other parts of the filtering surface.

Another object of the invention is to prevent excessive yielding of adjacent filtering surfaces so that they will not come into contact.

Another object of the invention is to provide a filtering unit that is easily replaceable, that is to say, the filtering material is so arranged and mounted that it may be replaced when damaged or when it has become inefficient.

Another object of the invention is to utilize a fabric or similar bag as the filtering agent, and dispose this bag in a coil in such manner that adjacent turns of the bag do not come into contact.

Another object of the invention is to provide a filter with a bypass so disposed that circulation of oil through the bypass, in cold weather, will thaw out the filter and render it operative.

Other objects and features of novelty will be apparent from the description taken in connection with the drawings, in which Figure 1 is a vertical sectional elevation through a complete filter constructed in accordance with the present invention;

Figure 2 is a sectional plan view taken substantially on line 2—2 of Fig. 1;

Figure 3 is a cross section through a portion of the filter bag, showing the filtering pockets;

Figure 4 is a plan view of the filtering bag before it has been coiled and showing the pipe at the upper edge thereof;

Figure 5 is a sectional view taken substantially on line 5—5 of Fig. 4; and

Figure 6 is a sectional elevation of a detail showing another method of securing the top head of the housing.

Referring to the drawings, the filter of the present invention comprises, briefly stated, a housing with a filtering bag disposed therein, the bag being rolled into a spiral coil with adjacent turns of the coil held out of contact with one another.

As shown in the drawings, the filter may comprise a housing consisting of the cylindrical shell 10 and the heads or end closures 11 and 12. These closures may be secured to the shell in any suitable manner, as by crimping or spinning the edges of the heads around the adjacent edges of the shell, as shown at 11ª and 12ª. Another method of securing the upper head 11 to the shell is shown in Fig. 6. Here the head is secured to the shell by studs 8 passing through the margin of the head and a flange on the shell, and screwing into a ring 9. For this form of the invention, the head can be removed so that the filtering unit within the housing may be replaced.

A development of the filtering bag is shown in Fig. 4. It comprises a rectangular bag 13 (of any suitable material, such as fabric or felt) having its marginal edges secured together in any suitable manner, as by means of the lines of stitching 14, 15 and 16. At its upper portion, a tube 17 is inserted within the bag, the point 18 where the tube emerges from the bag having the bag tightly engaged with or secured to the tube in any suitable manner. The projecting end 19 of the tube is bent, as shown, for a purpose presently to be described.

At the lower end of the bag, a rod 21 is disposed, the rod and tube 17 being sufficiently flexible so that they may be bent into coils.

At spaced points the interior surfaces of the bag are held together as by the spaced lines of stitching 22. If desired, these lines of stitching may stop short of the upper edges of the bag, but preferably extend downwardly to the rod 21, thus acting to hold the rod from displacement. The tube 17 is provided with a plurality of spaced apertures 23, there being preferably one of these apertures for each of the pockets 24 formed between adjacent lines of the vertical stitchings 22.

As previously stated, the filter unit of the present invention comprises this bag rolled up into a spiral coil. To form this unit, the bag, together with the delivery pipe 17 and the rod or wire 21 therein, is wound upon a mandrel, and in order to obtain the proper spacing between adjacent turns of the coil, a piece of flexible material is disposed against the bag before the coiling, to act as a spacer. After the bag has been completely coiled, this spacer is withdrawn. The pipe 17 and rod 21 act to hold the bag in its coiled shape with the vertical elements of the bag substantially parallel to the center line of the housing in which the filtering element is disposed.

In the form of the invention illus'rated, the filtering bag depends from the pipe 17 and the pipe 17 in turn is supported by a fitting carried by the upper head of the housing. Thus, as shown in Figs. 1 and 2, the projecting end 19 of the pipe 17 is secured to the tubular member 25 so that it is in communication with the interior 26 thereof. This member 25 is provided with a collar 27 abutting the under surface of the head 11 and has an exteriorly threaded portion 28 projecting through an aperture in the head. A coupling 29 is screwed onto this portion 28 so that the head is clamped between the collar 27 and the coupling 29. In this manner the complete fitting is supported by the head and in turn the filtering bag is properly disposed and supported within the housing.

In operation, the oil is supplied through the inlet 26, passes into the pipe 19, out through the perforations 23 and into the pockets 24 of the bag. Then the oil is filtered through the bag to the exterior thereof and discharged through the outlet fitting 30, which, in the embodiment of the invention illustrated, is disposed in the lower head of the housing.

When in use, the pressure within the filter bag tends to extend the bag so that the surfaces of adjacent turns of the bag might come in contact. To prevent this, at spaced points the interior adjacent surfaces of the bag are secured together as by the lines of stitching 22 previously described. This will prevent the bag from expanding to such an extent that the surfaces of adjacent turns will come in contact.

If desired, the filter may be provided with a bypass so that if it becomes clogged or resistance to circulation becomes too great, the oil will be bypassed from the inlet to the outlet. In the form of the invention illustrated, for this purpose, a thimble 31 is screwed on the lower end of the member 25 and has an aperture 32 in its lower end. A spring 33 within the thimble presses on the ball valve 34, thereby sealing the lower end of the member 25. When resistance to the flow of oil through the bag becomes sufficient to overcome the spring 33, the valve 34 opens and the oil passes directly into the center of the filter housing, leaving the same through the outlet 30.

When the resistance to the flow of oil through the filter is caused by water freezing therein or congealing of the oil, the circulation of the warm oil from the crank case of the engine through the center of the housing from its inlet to its outlet will gradually warm the entire filter, melting the ice and rendering the oil in the filter sufficiently fluid so that there can be a flow through the filtering surface. This novel result is accomplished by locating the bypass within the filter and so that the bypassed oil has a considerable path of flow within the housing before it is discharged therefrom.

The filter may be supported in any suitable manner. As shown, straps 35 are passed around the upper and lower ends of the shell 10 and other straps 36 are passed through slots in the ends of the straps 35. The straps 36 are then bent outwardly at the slots, thereby causing the straps 35 to snugly grip the shell 10. The ends of the straps 36 are formed as ears 37 having holes 38 therein to receive bolts by which the filter may be supported from the engine casing, the dash, or any convenient portion of the motor vehicle.

Although an embodiment of the invention has been described in detail, it is to be understood that the invention is not thus limited, but includes modifications and changes which come within the scope of the appended claims.

Having thus described the invention, what is claimed as new and desired to be secured by Letters Patent is:

1. A filter of the character described, including in combination, a housing, a filtering bag wound into a spiral roll, means to suspend said bag within the housing and hold adjacent turns out of contact, said means conducting fluid to the interior of the bag throughout the full length of one spiral edge thereof, and means to conduct filtered fluid from the exterior of the bag.

2. A filter of the character described, including in combination, a housing, a filtering bag wound into a spaced spiral roll and suspended within said housing, said bag being divided into pockets axially of the roll, suspension means to conduct fluid to the interior of each of said pockets and means to conduct fluid away from the exterior of the bag directly into the housing.

3. A filter according to claim 1 wherein the means to suspend the bag and hold adjacent turns out of contact comprises a spiral member within the bag at each end thereof, one of said members being tubular to conduct liquid to the bag.

4. The filter according to claim 1 with means to hold adjacent interior surfaces of the bag in contact along spaced axial lines.

5. A filtering unit for a filter of the character described, comprising a filtering bag wound into a spiral roll, a rigid spiral member within the bag at each end of the roll to hold the adjacent surfaces of the turns of the roll spaced, the remaining portion of the bag being free and provided with circumferentially spaced lines of stitching to hold the interior surfaces of the bag together along these lines.

6. A filter of the character described, including in combination, a housing having an inlet and an outlet, a filtering bag wound into a spiral roll and supported within said housing with adjacent turns of the roll held out of contact, means dividing the bag into a plurality of axially disposed pockets, and means providing direct communication between each pocket and said inlet, whereby the entire surface of the bag is utilized for filtering.

7. A filter of the character described, including in combination, a housing, means for holding and supporting a filtering bag within the housing in the form of a spaced turn spiral roll, an inlet to the interior of said bag, and means for holding adjacent turns of the roll from contact with each other, said last named means also acting to divide the bag into a plurality of pockets.

In testimony whereof I hereunto affix my signature.

ARTHUR A. BULL.